United States Patent [19]

Mikado

[11] 4,451,857
[45] May 29, 1984

[54] STILL PICTURE REPRODUCING APPARATUS

[75] Inventor: Tsuneo Mikado, Tokyo, Japan

[73] Assignee: Nippon Television Industry Corporation, Tokyo, Japan

[21] Appl. No.: 338,649

[22] Filed: Jan. 11, 1982

[30] Foreign Application Priority Data

Jan. 19, 1981 [JP] Japan .................................. 56-7072

[51] Int. Cl.$^3$ .............................................. H04N 5/76
[52] U.S. Cl. ................................................ 358/312
[58] Field of Search ................................ 358/312, 326

[56] References Cited

U.S. PATENT DOCUMENTS 4,376,954 3/1983 Ross .................................. 358/312

Primary Examiner—John C. Martin
Assistant Examiner—J. Sutherland
Attorney, Agent, or Firm—Woodcock, Washburn, Kurtz, Mackiewicz & Norris

[57] ABSTRACT

A still picture reproducing apparatus is provided with means for reproducing still picture information having a 4-field sequence of NTSC system from a recording medium such as a magnetic disc, with the time base of reproduced still picture information being extended from the time base of a normal video signal. A memory is provided for storing reproduced still picture information of four fields. The memory is controlled for reading out the contents therein, with picture information being compressed in time so that the normal time base is restored. A color framing circuit is provided for producing an NTSC color video signal having the 4-field sequence from a memory output for at least one field. The output from said color framing circuit and the output for four fields from said memory are changed-over in order by a switch circuit.

7 Claims, 14 Drawing Figures

FIG.6
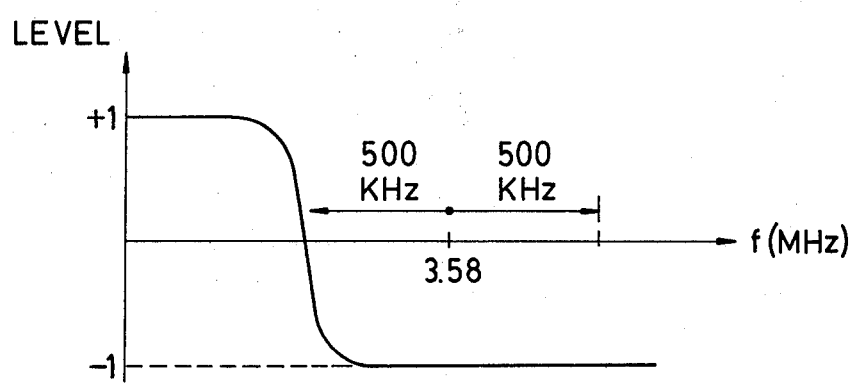
FIG.7A (1st FIELD) L22 L23 L24 L25
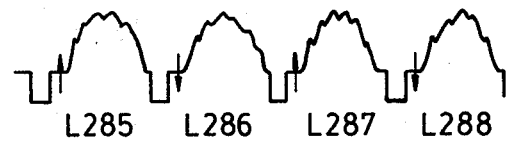
FIG.7B (2nd FIELD) L285 L286 L287 L288
FIG.7C (3rd FIELD) L22 L23 L24 L25
FIG.7D (4th FIELD) L285 L286 L287 L288

STILL PICTURE REPRODUCING APPARATUS

BACKGROUND OF THE INVENTION

The present invention relates to a still picture reproducing apparatus wherein the video signal obtained from the reproducing apparatus in an extended time base from that of the normal video signal is written into the memory and the video signal is read out from the memory in the normal time base.

DESCRIPTION OF THE PRIOR ART

There is known a still picture reproducing apparatus which makes coding (PCM) the color video signal, and records and reproduces the signal on a disk type recording medium. The amount of record information of the video signal is greatly increased due to coding, and it is difficult to carry out recording and reproduction in the same time base as that of the video signal unless the relative scanning speed between the recording medium and the recording/reproducing head is greatly increased or the number of tracks for parallel recording is increased. However, an increase of the relative scanning speed can deteriorate the quality of the reproduced signal, and the increased number of tracks can cause the complexity of the apparatus.

There is known a simplified still picture reproducing apparatus in which recording/reproducing time per frame is greatly increased by around 30 times. In such apparatus, the video signal with an extended time base is produced from the normal video signal so that it is written into the memory, and the video signal is re-formed by reading out the memory so that the normal time base is restored.

FIGS. 1 through 3 show such conventional still picture reproducing apparatus. In FIG. 1, the coded video signal recorded on a magnetic disk 1 is reproduced in about 0.4 sec per one field, then the reproduced signal is written into a 1-field memory 2. The 1-field memory 2 reads out the video signal in the normal time base, and a color framing circuit 3 is used in order to produce the NTSC signal having the 4-field sequence from the read-out one field signal.

That is to say, the frequency of the subcarrier (fsc) of the NTSC signal is chosen to be the horizontal frequency $f_H$ divided by two and multiplied by an odd number (455) in order that it is frequency-interleaved with the luminance signal. For this reason, the chroma phase is inverted alternately for each scanning line in the same field. The chroma phase is also inverted for the same scanning line in the first frame and the second frame. Accordingly, the NTSC signal has a cycle consisting of the 1st field through the 4th field (two frames), and the chroma phase is restored to that of the 1st field at the 5th field.

In the still picture reproducing apparatus shown in FIG. 1, one picture is switched to the next picture in about 0.4 sec which is the time for reading one field of the disk 1, causing relatively less flicker in switching one picture to the next picture. Disadvantageously, however, 4-field (two frames) picture information must be produced electrically from 1-field picture information, resulting in a poor quality of reproduced pictures.

In FIG. 2, 2-field picture signals are reproduced from the disk 1 and written in the 2-field memory 4, then the signals are read out in the normal time base of the video signal. Then, the NTSC color video signal having the 4-field sequence is produced from the 2-field video signal by the color framing circuit 5. The quality of this still picture reproducing apparatus is better than that of FIG. 1, however, it takes about 0.8 sec to reproduce 2-field information from the disk 1. Thus, it takes about 0.8 sec to switch one still picture to another still picture, causing a noticeable flicker in switching pictures.

In FIG. 3, 4-field picture signals are reproduced from the disk 1 and written in the 4-field memory 6. Then, the signals are read out in the normal time base to obtain the NTSC color video signal. This reproducing apparatus reproduces complete 4-field information, allowing the elimination of the color framing circuit, and the best picture quality is obtained. Disadvantageously, however, it takes about 1.6 sec to transfer 4-field of information from the disk 1 to the memory 6, causing a blank in switching picture.

In considering a system using any of the apparatus shown in FIGS. 1–3 for reproducing still pictures from one piece of disk and transmitting the pictures to multiple terminals (e.g. multiple studios in a TV station or multiple class rooms in school), the same problem as described above arises. That is, if two terminals request the transmission of reproduced still pictures concurrently, the second terminal is kept waited to get the still picture until the transmission to the first terminal is completed. This waiting time is minimum when the conventional apparatus of FIG. 1 is used, and it is about 0.8 sec as obtained by adding about 0.4 sec, i.e., the 1-field information transmission time for the first terminal, to the information transmission time for the second terminal. This wait is relatively short, but the picture quality is liable to deteriorate.

Use of the conventional apparatus of FIG. 2 will improve the picture quality, but doubles the wait. Use of the conventional apparatus of FIG. 3 provides the best picture quality, but it takes the waiting time of 2.4 sec at maximum.

The waiting time will further increase if more than two terminals request the transmission of still pictures concurrently.

SUMMARY OF THE INVENTION

It is an object of the present invention to speed up the switching from one still picture to the next still picture, and also obtain high quality pictures.

Another object of the present invention is to achieve for transmitting still pictures from one still picture reproducing apparatus to multiple output terminals the transmission of picture to each terminal with less waiting time even if two or more terminals request the transmission of pictures almost at the same time.

The above and other objects, features and advantages of this invention will be apparent in the following detailed description of illustrative embodiments which are to be read in connection with the accompanying drawings.

BRIEF DESCRIPTION OF THE DRAWINGS

FIG. 6 is a plot showing the frequency-level characteristics of the frequency-phase converter shown in FIG. 5;

FIGS. 7A to D are waveforms corresponding to the 1st field through the 4th field of the NTSC signal;

DESCRIPTION OF THE PREFERRED EMBODIMENTS

Figure 4:
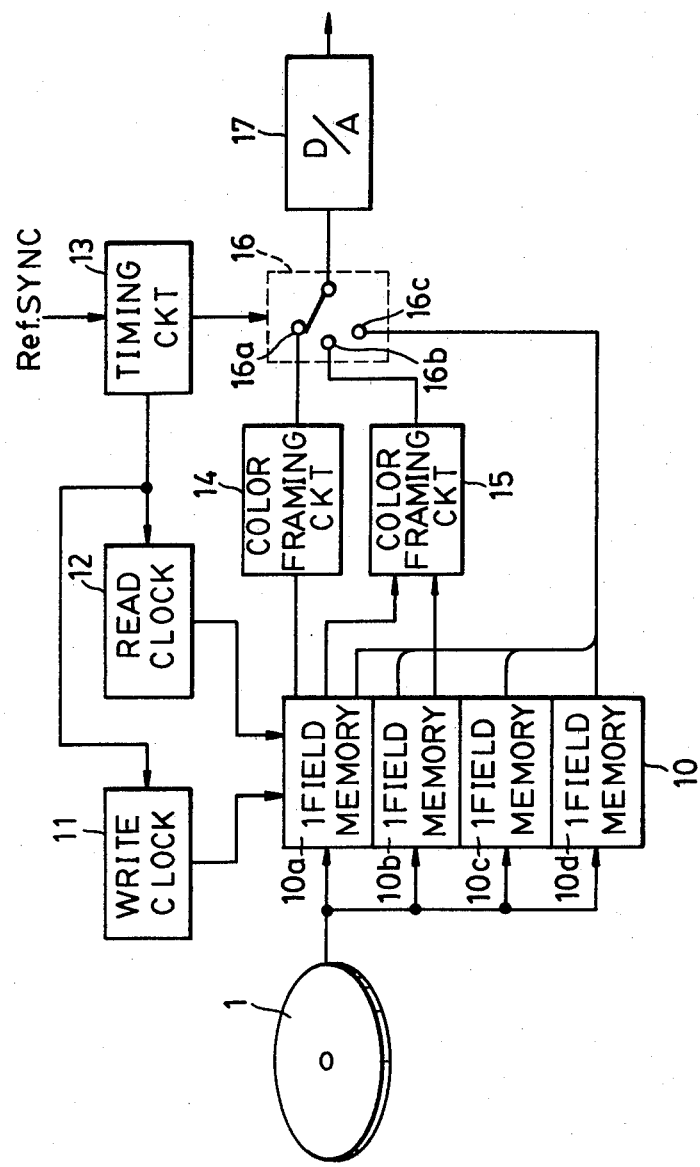
FIG. 4 is a block diagram of the still picture reproducing apparatus embodying the present invention.

FIG. 4 is a block diagram of the still picture reproducing apparatus embodying the present invention. In the embodiment, there is provided a memory 10 consisting of four 1-field memories 10a–10d, each having a storage capacity of one field, to which four fields of coded video signals from the disk 1 are written sequentially. The write clock (address) for the memory 10 is produced by the write clock forming circuit 11, and information is transferred from the disk 1 to the memory 10 in time of about 0.4 sec per field as in the case of the prior art system.

One piece of disk 1 stores, for example, 120–130 still pictures, and one still picture is generally produced by video signals for four fields.

The contents of the memory 10 are read out in response to the clock pulses produced by the read clock forming circuit 12. The frequency of the read clock is made equal, for example, to the frequency of the sampling pulse for coding the picture signal, so that the coded picture signal in the normal time base can be obtained from the memory 10. The write clock forming circuit 11, the read clock forming circuit 12 and the switch 16 which will be described later are controlled by the timing circuit 13 which operates in synchronization with the reference sync signal, Ref-SYNC.

Figure 1:
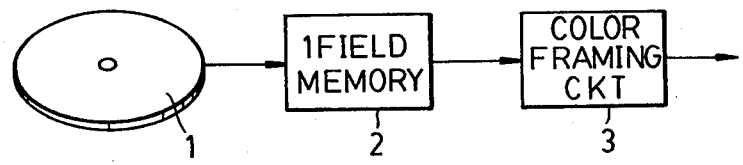
FIGS. 1 through 3 are block circuit diagrams showing in part the conventional still picture disk reproducing apparatus.

About 0.4 sec after transfer of information from the disk 1 to the memory 10 has started, writing to the 1-field memory 10a is completed, and the write operation is switched to the next 1-field memory 10b. At this point the read clock is supplied to the 1-field memory 10a, so that the video signal for one field length is delivered to the 1-field color framing circuit 14 as in the case of FIG. 1. The color framing circuit 14 produces the NTSC signal having the 4-field sequence. At this time the switch 16 is thrown to the contact 16a by control of the timing circuit 13, and the output of the color framing circuit 14 is conducted through the contact 16a of the switch 16 to the D/A converter 17 so that it is converted into the analog video signal. The output of the D/A converter 17 is displayed on the monitor screen.

Figure 2:
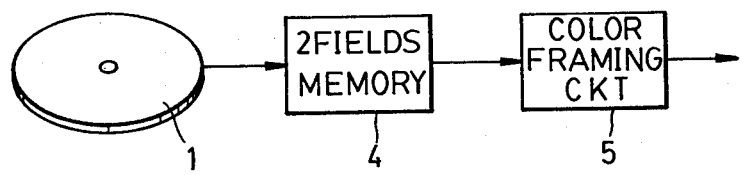
Figure 3:
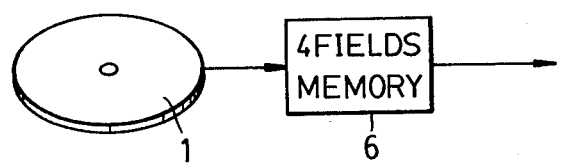

The still picture created by the output of the 1-field memory 10a is kept displayed on the monitor screen for a duration of about 0.4 sec until writing to the subsequent 1-field memory 10b is completed. After information has been written to the 2nd 1-field memory 10b, the write operation is switched to the 3rd 1-field memory 10c, and at the same time the read clock is supplied to the two 1-field memories 10a and 10b which have already been written. Then, the picture signal for two fields is supplied to the 2-field color framing circuit 15 as in the case of FIG. 2, and the NTSC signal having the 4-field sequence is produced. At this time the switch 16 is thrown to the contact 16b by control of the timing circuit 13, and the output of the color framing circuit 15 is conducted through the switch 16 to the D/A converter 17 so that it is displayed on the monitor screen.

The still picture created by the output of the 1st and 2nd 1-field memories 10a and 10b is displayed on the monitor screen for a duration of about 0.8 sec while information from the disk 1 is transferred to the third and fourth field memories 10c and 10d. At the end of writing to the 3rd and 4th field memories 10c and 10d, the video signals for four fields are written throughout the memory 10. Then, the read clock from the read clock forming circuit 12 is supplied sequentially to each part of the memory 10, and the video signals for four fields are read out consecutively. The read-out information having the 4-field sequence of NTSC is not processed for color framing, but delivered through the contact 16c of the switch 16 to the D/A converter 17, the output of which is displayed on the monitor screen. In this manner the contents of the memory 10 are read out repetitively, and a still picture is displayed. Since a display picture is formed from picture information for four fields, a very high quality picture is obtained.

As can be seen from the above description, display of picture can be started about 0.4 sec following the initiation of transfer of information from the disk 1 to the memory 10, and therefore the flicker due to the switching of pictures is not noticeable. Moreover, a still picture is formed eventually basing on picture information for four fields transferred from the disk 1 to the memory 10, and therefore a very high quality picture can be obtained.

Figure 5:
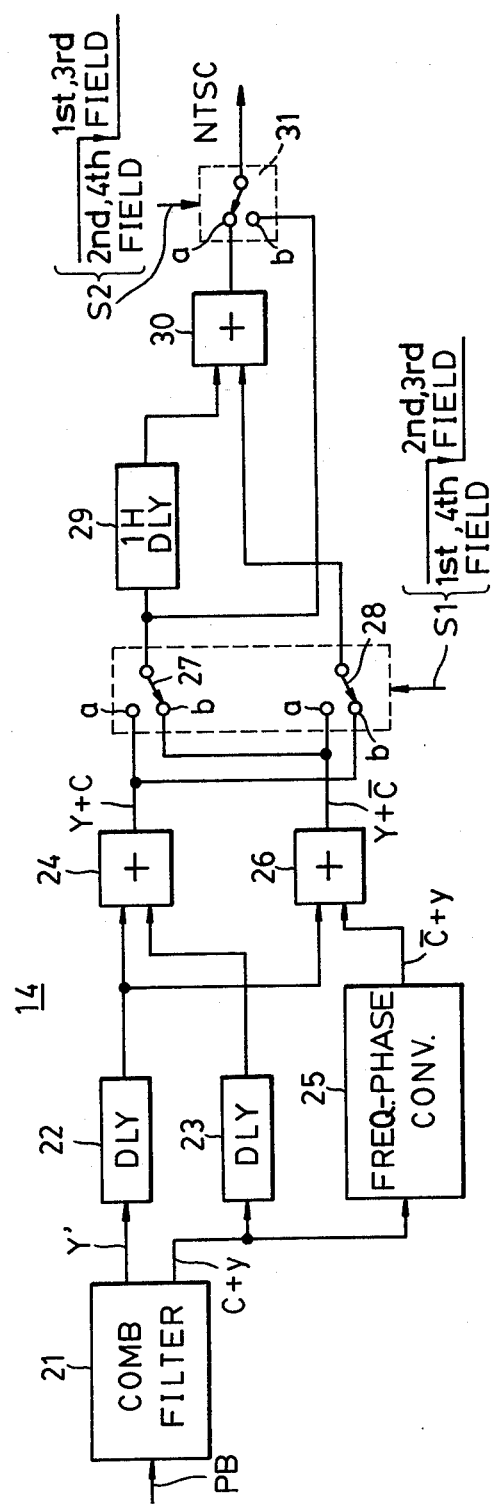
FIG. 5 is a block circuit diagram showing the 1-field color framing circuit in FIG. 4.
Figure 8:
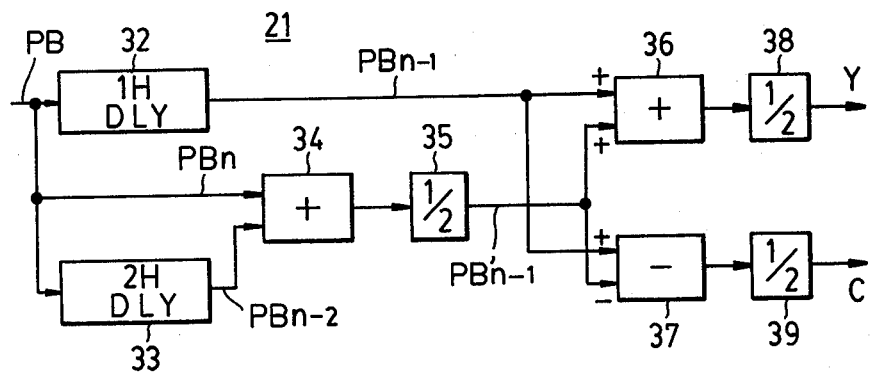
FIG. 8 is a block circuit diagram exemplifying the comb filter shown in FIG. 5.
Figure 9:
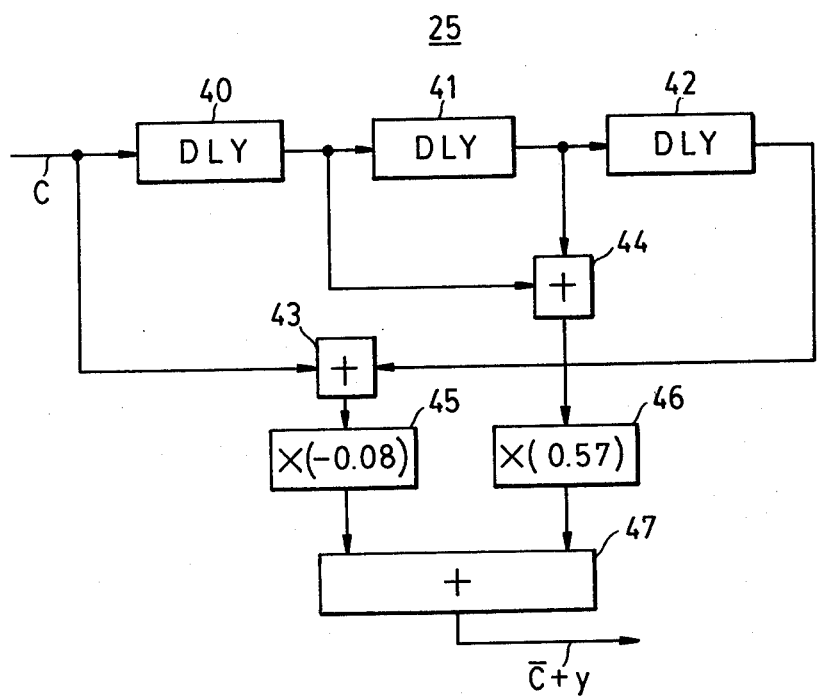
FIG. 9 is a block circuit diagram exemplifying the frequency-phase converter shown in FIG. 5.

FIG. 5 is a block circuit diagram showing an example of the 1-field color framing circuit shown in FIG. 4, FIG. 6 is a plot showing the frequency-level characteristics of the frequency-phase converter shown in FIG. 5, FIG. 7 is a set of waveforms of the 1st–4th fields of the NTSC signal, FIG. 8 is a block circuit diagram showing an example of the comb line filter shown in FIG. 5, and FIG. 9 is a block circuit diagram showing an example of the frequency-phase converter shown in FIG. 5.

In reading the 1st 1-field memory 10a in FIG. 4, the reproduced color picture signal of one field read out from the memory 10a is delivered to the comb filter 21. The comb filter 21 produces the luminance signal Y' and the chrominance signal C separately. The comb filter 21 separates the luminance and chrominance components by utilization of correlation between contiguous lines of the video signal, and therefore the luminance and chrominance signals are not separated completely in portions with no correlation, leaving one component in another as a residue component. For example, the chrominance signal C includes the residue luminance component Y. The outputs Y' and C+y from the comb filter 21 are delivered through the delay lines 22 and 23 to the adder 24, which yields the original reproduced signal Y+C.

On the other hand, the chroma signal C+y produced by the comb filter 21 is delivered to the frequency-phase converter 25 which has the frequency-level characteristics as shown in FIG. 6. As shown in FIG. 6, the level resides in −1 in a chroma band of 3.58 MHz±500 kHz, thus the inversephase chroma signal $\bar{C}$ is obtained from the converter 25. At frequencies lower than the chroma band, the input signal at a level of +1 is obtained. That is, the in-phase residue luminance component y in low frequency portions of the chrominance signal C from the comb filter 21 is obtained from the converter 25.

The output $\overline{C}+y$ from the frequency-phase converter 25 is supplied to the adder 26 so that it is added to the luminance signal Y' from the delay line 22. Accordingly, the residue luminance component is compensated at the output of the adder 26, and the picture signal with only the chrominance signal being inverted is obtained. The outputs of the adders 24 and 26 are conducted to the contacts a and contacts b of both changeover switches 27 and 28. The output of the switch 27 is supplied through the 1H delay line 29 to the adder 30 so that it is added to the output from the switch 28. The output of the adder 30 is conducted to the contact a of the changeover switch 31. The output of the switch 27 is conducted to the contact b of the switch 31, and the color video signal NTSC having the 4-field sequence is obtained from the output of the switch 31.

The switches 27 and 28 are operated by the control signal S1, which resides at a high level to select the contacts a when the 1st and 4th reference fields are processed. The signal S1 goes low to select the contacts b of the switches 27 and 28 when processing the 2nd and 3rd reference fields. The switch 31 is operated by the control signal S2, which selects the contact a at a high level for the 2nd and 4th fields, and selects the contact b at a low level for the 1st and 3rd fields.

The phase of the chrominance signal is inverted alternately for each line and also inverted alternately for each frame as shown by the arrows in FIGS. 7A–7D. For interlacing fields, there is provided a phase difference of 0.5H between an even numbered field and an odd numbered field. In the following explanation, the reproduced signal PB is assumed to be the signal of the 1st field.

First, when the reference field is the 1st field, the switches 27 and 28 select contacts a and the switch 31 selects the contact b, then the output Y+C (virtually same as the reproduced signal PB) of the adder 24 is conducted through the switches 27 and 31.

When the reference field is the 2nd field, the switches 27 and 28 select the contacts b and the switch 31 selects the contact a. Then, the output $Y+\overline{C}$ of the adder 26 is conducted through the 1H delay line 29 to the adder 30, and the output Y+C of the adder 24 is supplied through the switch 28 to the adder 30. Consequently, the signal Y+C for line 24 of the 1st field is added to the signal $Y+\overline{C}$ for the previous line 23 coming from the delay line 29 and having an inverse chroma phase. Addition of the signals results in a signal for line 286 of the 2nd field (see FIG. 7B) with its chroma phase inverted and with the luminance signal and chrominance signal being interpolated. That is, the output of the adder 30 is a signal having the chroma phase of the normal 2nd field and also is an interpolated signal.

The output of the adder 30 is led out through the contact a of the switch 31 as the color video signal for the 2nd field.

When the reference field is the 3rd field, the switches 27 and 28 select the contacts b and the switch 31 selects the contact b.

Accordingly, the output $Y+\overline{C}$ from the adder 26 is led out through the contacts b of the switches 27 and 31. The signal $Y+\overline{C}$ is derived from the reproduced signal for the 1st field with its only chroma phase being inverted, and it coincides with the color video signal for the 3rd field.

When the reference field is the 4th field, the switches 27 and 28 select the contacts a and the switch 31 selects the contact a. Accordingly, for example, the signal $Y+\overline{C}$ for line 24 of the 1st field with its chroma phase inverted is added to the signal Y+C for the previous line 23 of the 1st field. This addition results in a signal for line 286 of the 4th field having the normal chrominance signal and with the luminance signal and the chrominance signal being interpolated. That is, the output of the adder 30 is a signal having a normal 4th-field chroma phase, and is an interpolated signal. The output of the adder 30 is led out through the contact a of the switch 31 as the color video signal for the 4th field.

FIG. 8 is a block circuit diagram of the comb filter 21 shown in FIG. 5. This comb filter can be realized using circuitries known in the art. In FIG. 8, the reproduced picture signal PB is delayed by the 2H delay line 33. Assuming the original signal to be PBn for line n, the delay line 33 outputs signal $PB_{n-2}$ which is the signal for the line preceding by two lines. The signals $PB_n$ and $PB_{n-2}$ are added by the adder 34, then the signal level is halved by the attenuator 35. Consequently, the attenuator 35 outputs the interpolated signal $PB'_{n-1}$ having the luminance signal virtually equal to the signal for line $n-1$ and the chrominance signal in the inverse phase. The reproduced signal $PB_n$ is supplied to the 1H delay line 32, which produces the signal $PB_{n-1}$ for the actual line $n-1$.

The correlative signals $PB_{n-1}$ and $PB'_{n-1}$ are added by the adder 36, then the signal level is halved by the attenuator 38. Accordingly, the attenuator 38 outputs the luminance signal Y separately in which the chroma signals in opposite phases are cancelled. The signal $PB_{n-1}$ is subtracted by the signal $PB'_{n-1}$ by the subtractor 37, then the signal level is halved by the attenuator 39. Thus, the attenuator 39 outputs the chrominance signal C in which the correlative luminance components are cancelled.

FIG. 9 is a block circuit diagram of the converter 25. In FIG. 9, the chroma signal C which has been converted from analog to digital by a sampling frequency of 4 fsc four times as high as the color subcarrier frequency, for example, is delayed by the 4-bit delay units 40–42 (e.g. shift registers) sequentially by ¼ fsc at each unit. The input and output of the delay unit 41 are added by the adder 44, then its output is multiplied by a factor of 0.57 by the multiplier 46. The original signal C is added to the output of the delay unit 42 by the adder 43, then its output is multiplied by a factor of −0.08 by the multiplier 45. The outputs of the multipliers 45 and 46 are added by the adder 47, and a filtered signal is obtained. The digital filter shown in FIG. 9 has the frequency-level characteristics as shown in FIG. 6, and the adder 47 outputs the chrominance component $\overline{C}$ in an opposite phase relative to the input but including the in-phase residue luminance component y. The cut-off frequency characteristic of the filter shown in FIG. 6 can be made sharper by increasing the number of stages of the delay units 40–42.

Figure 10:
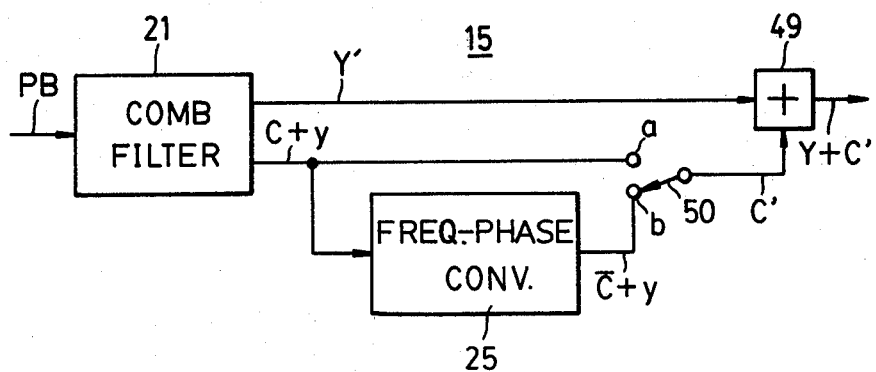
FIG. 10 is a block circuit diagram of the 2-field color framing circuit shown in FIG. 5.

FIG. 10 is a block diagram of the 2-field color framing circuit in FIG. 4. For obtaining the reproduction signals from the 1st and 2nd 1-field memories 10a and 10b in FIG. 4, the color picture signal PB for two fields read out from the memories is supplied to the comb filter 21 which is similar to one shown in FIG. 5, so that the chrominance signal including the luminance signal Y' and the residue luminance signal y is separated. The separated luminance signal Y' from the comb filter 21 is supplied to the adder 49 directly. The chrominance signal C+y is delivered to the contact a of the switch 50 and also delivered to the contact b through the frequency-phase converter 25 similar to one shown in FIG. 5.

The frequency-phase converter 25 outputs the chrominance signal $\bar{C}$ having an inverse phase in a band of 3.58 MHz±500 kHz and the lower frequency residue luminance component y without phase inversion as mentioned previously.

For the 1st and 2nd fields, the switch 50 selects the contact a so that the chroma signal C without phase inversion and including the residue luminance component y is added to the luminance signal Y' by the adder 49. For the 3rd and 4th fields, the switch 50 selects the contact b so that the phase-inverted chrominance signal $\bar{C}$ including the residue luminance component y is added to the luminance signal Y' by the adder 49. Consequently, the color picture signal Y+C' restored to an NTSC signal is obtained at the output of the adder 49.

There are various circuits known in the art for use as the color framing circuits 14 and 15 other than those shown in FIGS. 5 and 10. Also, a changeover switch which operates together with the changeover switch 16 in FIG. 4 may be used so that the comb filter 21 and the frequency-phase converter 25 are shared by the circuits of FIGS. 5 and 10.

The color framing circuit 15 in FIG. 4 may be omitted. In this case, the changeover switch 16 will be a double-pole switch for selecting the output of the color framing circuit 14 and the composite output of the 1-field memories 10a–10c. This arrangement functions identically to the embodiment shown in FIG. 4 and simplifies the overall circuit. The quality of picture will be deteriorated slightly in a period of about 1.6 sec as compared with the case of FIG. 4 due to the write operation for entire information in the memories 10a–10c. However, this is not a practical problem.

The present invention enables the fast switching of display pictures from one picture to another by displaying the new picture at latest immediately after the 1st memory has been written, causing a flicker during the switching unnoticeable. Moreover, a still picture is reproduced using picture information for four fields on completion of writing to all of the 1st through 4th memories, thereby reproducing high quality picture.

Figure 11:
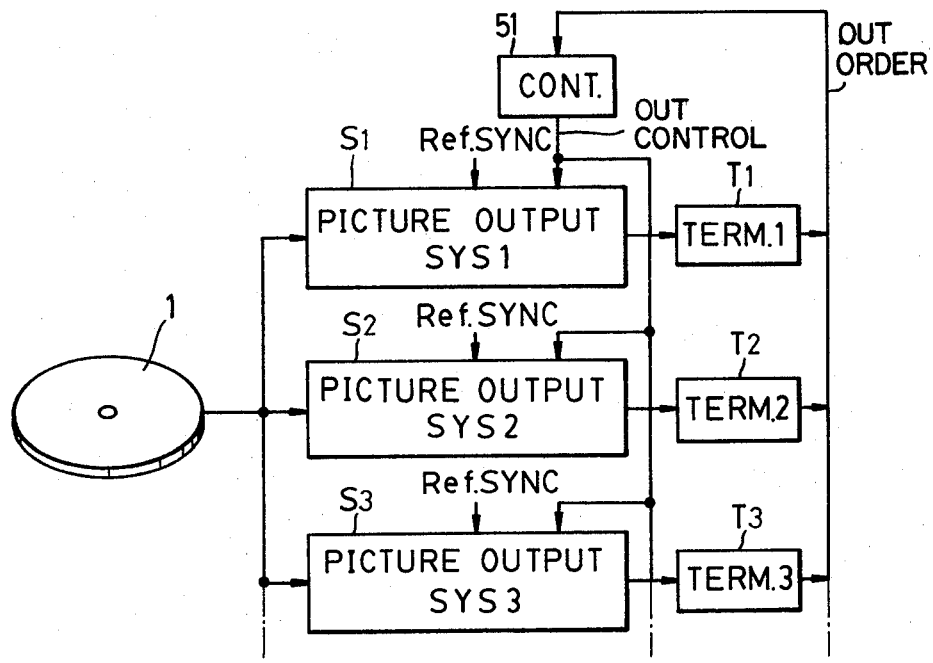
FIG. 11 is a block diagram showing another embodiment of the still picture reproducing apparatus according to the present invention.

FIG. 11 is a block diagram of another embodiment of the still picture reproducing apparatus according to the present invention. In FIG. 11, a disk 1 is connected to a plurality of picture output systems S1, S2 and S3 and so on, each having the same circuit arrangement as shown in FIG. 4, and they receive reproduced picture signals from the disk 1. These picture output systems S1, S2 and S3 and so on are connected to the terminals T1, T2 and T3 and so on, respectively, including monitor screens, for example.

The picture signal is transferred in a slower time base than that of the normal video signal itself. The video signals transferred to the picture output systems S1, S2 and S3 are written into memories 10 within the output systems as will be described later, then the signals are read out in the normal time base and sent to the terminals T1, T2 and T3.

On the other hand, a picture request signal, OUT ORDER, is issued in response to the request from the terminal T1, T2 or T3. The OUT ORDER signal is given to the picture output control unit 51, which then produces a picture output control signal, OUT CONTROL. The OUT CONTROL signal corresponding to the request from the terminal T1, for example, controls the memory 10 in the corresponding picture output system S1 to write the picture signal for the requested still picture derived from the disk 1. The OUT CONTROL signal also causes an interrupt for writing the picture signal from the disk 1 when one still picture request and another request overlap.

The reference sync signal, Ref. SYNC, determines the timing of the interrupt and read operations, and also serves as a reference signal for producing the address signal for writing and reading the memory 10.

The following describes the operation when the picture signal is transferred from the memory 10 in the picture output system S1, for example, and a still picture request is issued by another terminal T2 during the write operation of the system S1.

P—1: When the memory 10 of the picture output system S1 is being written the first 1-field information, the write operation is suspended at an appropriate time after the information has been written. When the memory 10 is being written a second or later field information, the write operation is suspended immediately. This enables an interrupt for writing the video signal from the disk 1 to the memory 10 of the picture output system S2 corresponding to the terminal T2.

P—2: The first 1-field video signal for a still picture requested by the terminal T2 is written to the memory 10 of the picture output system S2 in interrupt mode. Then, the selected still picture is displayed on the monitor screen or the like on the terminal T2 in accordance with the 1-field video signal.

P—3: After the write operation of step P—2 has been completed, the memory 10 of the picture output system S1 whose write operation was suspended in step P—1 is restarted writing.

P—4: After the write operation of step P—3 has been completed, the memory 10 of the picture output system S2 which was written the first 1-field information in step P—2 is restarted writing.

As described previously, still pictures are displayed on the monitor screens or the like on the terminals T1 and T2 of the picture output systems S1 and S2 in accordance with at least the first 1-field video signals following the writing of the picture signals to the memories 10.

Consequently, even if still picture requests are issued by two terminals T1 and T2 at the same time, high quality still pictures are transmitted to the terminals with less time delay for switching.

It is obvious that the operation takes place identically when still picture requests are issued by three or more terminals T1, T2, T3 and so on at the same time.

If a plurality of terminals T1, T2, T3 and so on request the transmission of still pictures at exactly the same time, the picture signals are transmitted in order as predetermined in the control unit 50 of the picture output system.

Writing for the remaining fields after the interrupt operations of steps P—3 and P—4 can be processed in the time sharing interrupt mode. That is, on completion of the interrupt operation for one field, the remaining video signals can be written to the memory 10 by the two picture output systems S1 and S2 alternately one field at a time.

As described above, this embodiment makes it possible the interrupt for writing from the storage medium to the memory, so that still pictures by video signals having the NTSC sequence are reproduced and transmitted promptly to terminals in accordance with at least the first 1-field picture signals when picture requests from a plurality of terminals occur concurrently.

In this arrangement, still picture formed by at least the first 1-field video signals can be transmitted to the terminals promptly even if picture requests are issued by a plurality of terminals concurrently. Thus, the switching time of still pictures on the terminals can be made short. Moreover, a still picture is reproduced using 4-field video signals at the end of writing 4-field video signals to the memories, whereby a high quality picture can be reproduced.

We claim:

1. A still picture reproducing apparatus comprising:
   (a) means for reproducing still picture information having a 4-field sequence of NTSC system from a recording medium, with the time base of reproduced still picture information being extended from the time base of a normal video signal;
   (b) a memory for storing reproduced still picture information of four fields;
   (c) a memory read control means for reading out the contents of said memory, with picture information being compressed in time so that the normal time base is restored;
   (d) a color framing circuit for producing an NTSC color video signal having the 4-field sequence from a memory output for at least one field; and
   (e) a switch circuit for selecting one of the output from said color framing circuit and the output for four fields from said memory.

2. A still picture reproducing apparatus according to claim 1, wherein said memory comprises a 1st, 2nd, 3rd and 4th memory blocks each capable of storing picture information for one field, the output of said 1st memory block being connected to said color framing circuit.

3. A still picture reproducing apparatus according to claim 2 further comprising another color framing circuit connected to the outputs of said 1st and 2nd memory blocks, said color framing circuit producing an NTSC color picture signal having the 4-field sequence from the memory output for two fields.

4. A still picture reproducing apparatus according to claim 3, wherein said switch circuit has three selective contacts for sequentially selecting three picture informations including the output of said color framing circuit, the output of said another color framing circuit and the outputs of said 1st, 2nd, 3rd and 4th memory blocks.

5. A still picture reproducing apparatus according to claim 1 comprising a plurality of picture output systems corresponding to a plurality of output terminals, each picture output system comprising said memory, said memory read control means, said color framing circuit and said switch circuit, the output of said switch circuit of each system being connected to said respective output terminal.

6. A still picture reproducing apparatus according to claim 5 further comprising a system control means for receiving picture transmission request signals issued by said output terminals, wherein said system control means operates a picture output system corresponding to a terminal which has requested the picture transmission.

7. A still picture reproducing apparatus according to claim 6, wherein said system control means controls the interrupt for writing memory, and when during a write operation to the memory in one picture output system, another output terminal requests a still picture reproduction and transmission, said system control means carries out an interrupt for writing memory so that the memory in another picture output system is written a picture signal for at least one field corresponding to the requested still picture, the reproduction output being transmitted to said another terminal through said color framing circuit in accordance with the picture signal stored in said memory.

* * * * *